J. NIEZNALSKI AND J. BELCZYNSKI.
RETORT CLEANING MACHINE.
APPLICATION FILED OCT. 7, 1919.

1,392,020.

Patented Sept. 27, 1921.
9 SHEETS—SHEET 2.

FIG. 2.

Inventors
J. Nieznalski
J. Belczynski

By A. W. Wilson

Attorney

J. NIEZNALSKI AND J. BELCZYNSKI.
RETORT CLEANING MACHINE.
APPLICATION FILED OCT. 7, 1919.

1,392,020.

Patented Sept. 27, 1921.
9 SHEETS—SHEET 4.

J. NIEZNALSKI AND J. BELCZYNSKI.
RETORT CLEANING MACHINE.
APPLICATION FILED OCT. 7, 1919.

1,392,020.

Patented Sept. 27, 1921.
9 SHEETS—SHEET 6.

Inventors
J. Nieznalski
J. Belczynski

By A. M. Wilson
Attorney

J. NIEZNALSKI AND J. BELCZYNSKI.
RETORT CLEANING MACHINE.
APPLICATION FILED OCT. 7, 1919.

1,392,020.

Patented Sept. 27, 1921.
9 SHEETS—SHEET 7.

Inventors
J. Nieznalski
J. Belczynski

By A. M. Wilson
Attorney

Inventors
J. Nieznalski
J. Belczynski

UNITED STATES PATENT OFFICE.

JOSEPH NIEZNALSKI AND JAN BELCZYNSKI, OF DETROIT, MICHIGAN.

RETORT-CLEANING MACHINE.

1,392,020.

Specification of Letters Patent.   Patented Sept. 27, 1921.

Application filed October 7, 1919.   Serial No. 329,170.

*To all whom it may concern:*

Be it known that we, JOSEPH NIEZNALSKI and JAN BELCZYNSKI, citizens of the United States of America, residing at Detroit, in the county of Wayne and State of Michigan, have invented certain new and useful Improvements in Retort-Cleaning Machines, of which the following is a specification.

The primary object of the invention is to provide a cleaning device for furnaces and retorts whereby a large number of retorts may be bored out and cleaned simultaneously with only slight labor and attention on the part of the workmen.

A further object of the device is to provide a cleaning means for retorts whereby a motor is easily controlled for simultaneously boring out a plurality of retorts simultaneously as well as for the purpose of moving the boring means toward and away from the retorts and for conveying the entire machine to any point desired, and cooling means being supplied during the boring operation.

The invention therefore provides a plurality of borers simultaneously operable by motive power carried by a laterally movable platform upon a motor truck, the entire structure possessing great strength but being easy to care for and control.

With these general objects in view, the invention will now be fully described in connection with the accompanying drawings and in which like reference characters designate corresponding parts throughout the several views, In the drawings.

The invention being designed for simultaneously cleaning a furnace, three track rails 1 are provided upon which the truck 2 is adapted to travel adjacent a furnace having a plurality of open-mouthed retorts such as 11, a laterally shiftable platform 3 being provided for the truck with a mechanism casing 4 positioned upright at the forward end thereof. A driving shaft 9 is journaled in uprights 5 upon the platform 3 with balance wheels 6 upon said shaft. A crank 7 of the shaft 9 is operatively connected by the piston rod member 8 with the motor 10 upon said platform.

Figure 1:
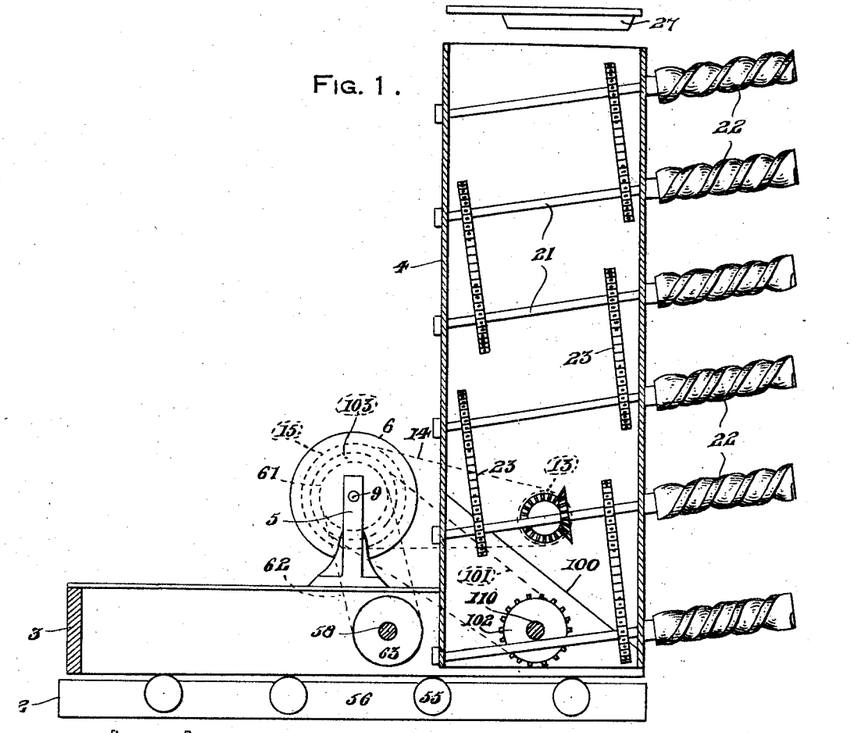
Figure 1 is a longitudinal vertical sectional view of the invention illustrated in position for use, with parts removed.
Figure 2:
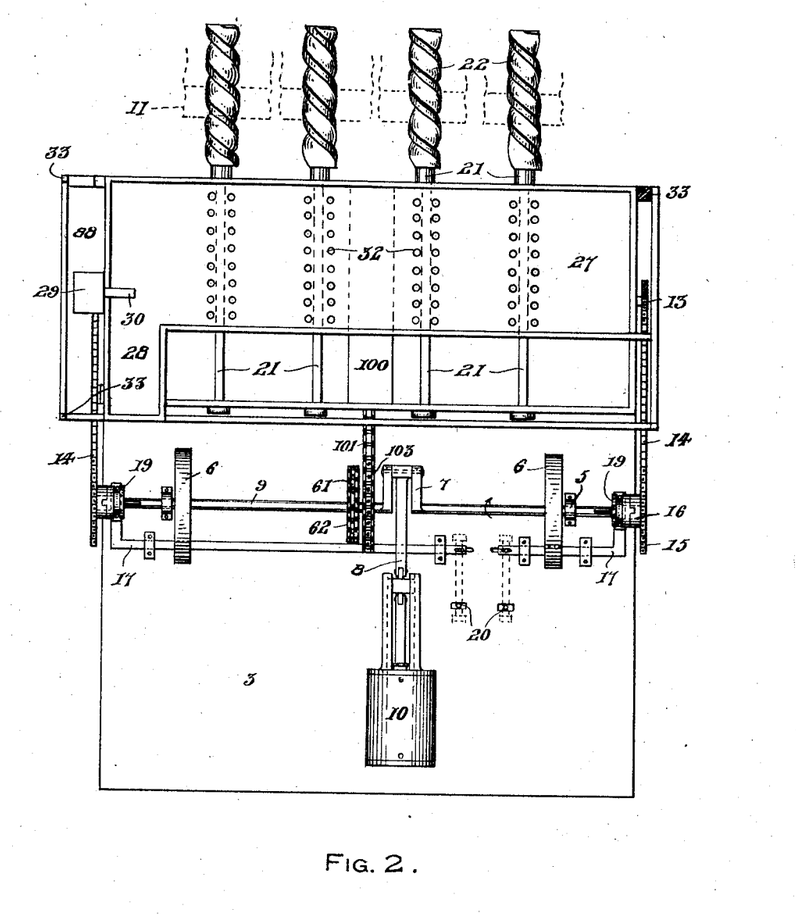
Fig. 2 is a top plan view thereof with parts broken away and parts removed, Fig. 2ᵃ is a side elevation of a lower portion of the invention.

Stub shafts 12 are journaled through the opposite sides of the casing 4 having sprockets 13 connected by means of chains 14 with sprockets 15 of clutch member 16 upon the opposite ends of the power shaft 9. Angular levers 17 are slidably mounted upon the platform 3 with forks 18 engaging clutch members 19 upon the shaft 9 adapted to coöperate with the clutch member 16. An operating handle 20 is provided upon the platform 3 for each of the levers 17 whereby the stub shafts 12 may be clutched up with the power shaft 9 at the same or separate times, as illustrated in Fig. 2 of the drawings.

Boring shafts 21 are journaled through the casing 4 having boring heads or augers 22 positioned thereon and adapted to enter the retort mouths 11 for cleaning the retorts. The boring shafts 21 are connected together in two groups by means of sprocket chains 23 and sprocket wheels 24 so that the entire number of shafts 21 and augers 22 are divided into two groups. Each group of boring members is operatively connected with one of the stub shafts 12 by means of a beveled gear 25 upon the stub shaft meshing with a similar gear 26 upon the adjacent auger shaft 21.

From this description of the augers 22 and their operative connections, it will be seen that when the motor 10 is in operation with the shaft 9 revolving, the shifting of the handles 20 of the clutch lever 17 will control the clutch members 16 and 19 thereof. Upon closing the clutch members 16 and 19 for one of the stub shafts 12, the said shaft will be driven by means of its sprocket chain 14 and the gear connections 25 and 26 will cause all of the auger shafts 21 connected therewith to revolve. One half of the total number of augers 22 will be simultaneously operated in this manner and will project within the retort mouths 11 when the platform 3 is moved toward the furnace by means hereinafter fully described. The remaining augers 22 will be set in motion in a similar manner by the other clutch lever 20 when the furnace is of larger dimension, requiring the use of all of the augers 22 for clearing the retorts.

Figure 2A:
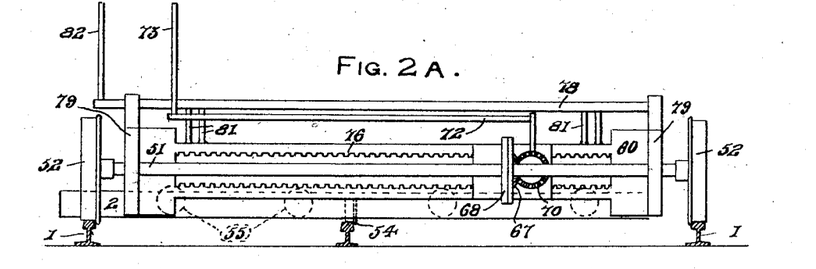

The means will now be described whereby the driving shaft 9 is utilized for propelling the entire device in its travel along the rails 1 as well as for shifting the platform 3 laterally of the truck 2 into and out of its operative position. The truck 2 comprises a rearwardly extending portion 49 and a transverse forward portion 50. An axle 51 is journaled at each end of the frame portion 50 arranged with wheels 52 mounted upon the rails 1. Transverse braces 53 are carried centrally of the frame portion 49 of the truck arranged with flanged wheels 54 for traveling upon the middle rail of the track rails 1, as illustrated in Fig. 2ᴬ of the drawings. Rollers 55 are journaled in the main beams 56 of the truck 2 upon which are the supporting beams 57 of the platform 3.

A driven shaft 58 is journaled through the platform beams 57 and projecting through longitudinal openings 59 in the ends 60 of the truck frame portion 50 has operative connection with the axles 51 whereby the wheels 52 are driven and the device readily propelled in its travel upon the rails 1. A sprocket-wheel 61 upon the driving shaft 9 is connected by means of a sprocket-chain 62 with a similar wheel 63 upon the truck shaft 58.

A journaling block 49 for the shaft 58 is slidably mounted in the connecting portion 64 of each end 60 for the truck frame portion 50 arranged with an arm 66. A beveled gear 67 is journaled in a head 68 at the free end of each arm 66 while the gear 67 has a squared central opening 69 whereby the gear is slidably mounted upon the squared axle 51 of the driving wheel 52. A pinion 70 is arranged at each opposite end of the shaft 58 in constant mesh with the adjacent gear 67 while a clutch 71 is provided for each of the pinions 70 for connecting said pinions with and disconnecting them from the shaft 58. Suitable operating rods 72 are provided for the clutches 71 having upright hand levers 73.

When it is desired to propel the device in either direction upon the track rails 1, the clutches 71 are set by means of the levers 73 as required for operatively connecting which ever one of the axles 51 it is desired to drive by the motor 10, it being understood that when one of said axles is being turned, the other axle must be unclutched and be pulled along. When driving by one of the axles 51, the device will be propelled in one direction and when driving by the other axle 51 the device will travel in an opposite direction. It will be seen that the shaft 58 moves bodily with the shifting of the platform 57 which is permitted by the slidable connection of the block 65 with the truck ends 60 as well as the slidable mounting of the gears 67 upon the axles 57. The device may be driven in this manner upon the track rails 1 to any desired position by means of the motor 10 and while the platform 3 with its casing 4 is at any adjustment upon the main truck 2.

Double racks 74 in the form of a rectangular plate 75 having opposite toothed portions 76 are vertically adjustably carried by the said truck ends 60, while a gear 77 is arranged within each rack 74 for selectively meshing with the opposite toothed portions thereof, the said gears 77 being secured to a shaft 110 parallel to the shaft 58. A rod 78 is journaled in the end extensions 79 at one end of the truck portion 50 having arms 80 pivotally connected to ears 81 of the adjacent rack 74. An upright hand lever 82 is carried adjacent the free end of the rod 78 in close proximity of the motor 10 and it will be seen that by shifting the lever 82, the rod 78 may be partially revolved for elevating the rack 74 and bringing the lower toothed portion 76 thereof in meshing engagement with the adjacent gear 77. The corresponding rack 74 and gear 77 at the opposite end of the truck frame portion 50 being simultaneously operable by means hereinafter described, it will be seen that the revolving of the shaft 110 will cause the gears 77 to travel in one direction longitudinally of the racks 74 and whereby the entire platform 3 and casing 4 will be shifted upon the truck 2, riding upon the rollers 55. A reverse movement of the lever 82 permits and assists the racks 74 to lower bringing the upper toothed portions 76 thereof into meshing relations with the gears 77 whereby the platform 3 is shifted in an opposite direction upon the truck 2 when the shaft 110 is revolved by means of the motor 10. It will be evident that with the shaft 110 adapted to revolve in only one direction, the meshing of the gears 77 with the opposite toothed portions 76 of the racks 74 causes the travel of the platform 3 in either direction desired upon the truck 2 from its rearward position to its forward boring position and vice versa.

A relatively short rod 83 is journaled in the end extensions 79 at the opposite end of the truck frame portion 50 from the aforementioned rod 78, the rod 83 having arms 84 pivotally connected to the ears 81 of its respective rack plate 75. A depending link 85 is carried by the rear end of the rod 83 connected by a pivotal double link 86 with the disk 87 journaled upon the frame extension 79 at a point beneath the rod 78. The arm 80 upon the rod 78 is pivotally connected to the disk 87 by a link 89 and whereby any movement imparted to the rod 78 by means of the lever 82 correspondingly moves the disk 87 and the link 86 so that the rack plates 75 are simultaneously shifted either upwardly or downwardly for engaging the desired toothed portions 76 of the racks 74 with the gears 77.

The manner of controlling the travel of the truck 2 upon its wheels 52 and 54 over the track rails 1 has already been described, the movement of the device being effected in either desired direction by manipulating the hand levers 73 of the clutches 71. The complete operation of the device will be fully understood from the foregoing detailed description of the separate elements, it being seen that the truck 2 may travel to a point adjacent the retorts 11 with the platform 3 in its normal rear position upon the truck, while the lever 82 may be then manipulated for properly shifting the racks 74 to permit the motor-driven shaft 110 to move the platform 3 with its casing 4 adjacent the retorts 11 and with the augers 22 in alinement with the open mouths of the said retorts.

A tray 27 is carried adjacent and preferably above the casing 4 with a side portion or gutter 28 at one side of the casing. A suitable pump 29 upon the casing 4 has an outlet spout 30 emptying into the gutter or trough 28, while the supply of water to the waterhead 29 is supplied by the pipe 31, it being understood that any other suitable source of supply may be provided for said pipe 31. Perforations 32 through the tray 27 are positioned above the augers 22 whereby water from the tray flows upon the shaft portions of the augers during the boring of the retorts. This water supply prevents the augers from becoming overheated both by reason of the friction caused in the boring operation as well as the heat of the furnace, and cleans the augers when retracted.

The tray 27 is preferably mounted upon posts 33 carried by the members 60 adjacent the corners of the casing 4. The tray 27 is stationary while the casing 4 moves beneath the tray with the platform 3. The spout 30 delivers water into the tray through the trough portion 28 thereof in whichever position the casing 4 assumes so that water is fed upon the inclosed portions of the augers 22 when they project into the retorts 11 upon the forward movement of the platform 3.

The operation of cleaning retorts is rendered quick and easy by our invention, it being understood that the machine is propelled upon the rails 1 in close proximity to the furnace with the platform 3 positioned rearwardly and when the augers 22 are brought into alinement with the retorts 11, the lever 82 is shifted for positioning the gears 77 with the lower toothed portions of the racks 75 and the platform 3 and casing 4 is moved forwardly, feeding the augers 22 into the work, the augers being set in motion by means of two clutch handles 20.

The augers 22 are preferably inclined for insertion and operation within the retorts 11. The tray 27 is in the form of a sieve through the perforations 32 of which the water received from the pump 29 drops downwardly through the open top of the casing 4 upon the auger shafts 21 when the augers 22 are projected for operating in the retorts 11. The water cools the shafts 21 and the augers 22 and upon retracting the augers by the rearward travel of the platform 3 and casing 4, the water through the perforations 32 will fall upon the augers 22 for cleaning the same. The rows of perforations 32 are directly above the path of movement of the shafts 21 and augers 22, it being understood that while the platform 3 with its casing 4 and the augers 22 are movable, the tray 27 is stationary. The pump 29 is also stationary being secured to the side of the casing 4 and extending upwardly through an opening 88 in the adjacent end of the tray 27. The forward and rear movements of the casing 4 and pump 29 permit the water from the spout 30 to flow into the trough 28 regardless of the relative positions of the pump 29 and the tray 27.

The operating member or handle 90 of the pump 29 is connected by a link 91 with a crank 92 carried by the adjacent clutch member 19 upon the shaft 9. The clutch member 19 being splined upon the shaft 9 while the clutch members 16 are rotatable upon said shaft, insures the operation of the crank 92 and the pump 29 during the revolving of the shaft 9. The water cooling mechanism will be fully understood from this detailed description thereof, the water being serviceable from any suitable source of supply for cooling as well as cleaning the augers 22.

Openings or windows 93 in the front and rear sides of the casing 4 permit the operator to view the retorts 11 through the casing 4 for the purpose of moving the platform 3 forwardly as well as the truck 2 laterally to bring the augers 22 in alinement with the mouths of the retorts 11.

Figure 3:
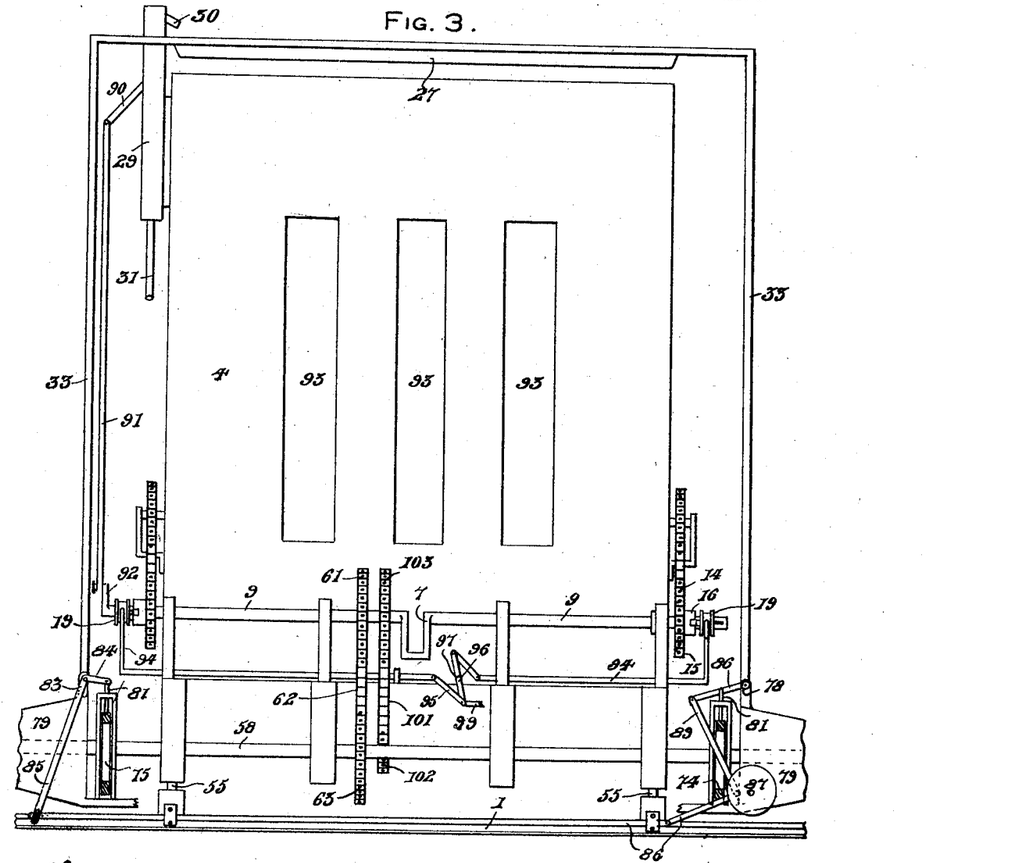
Fig. 3 is a rear elevation of the same with parts broken away and removed.
Figure 4:
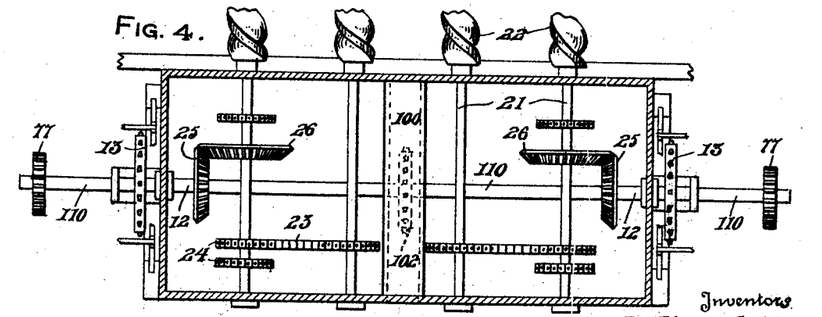
Fig. 4 is a horizontal sectional view through the casing with the augers broken away.
Figure 5:
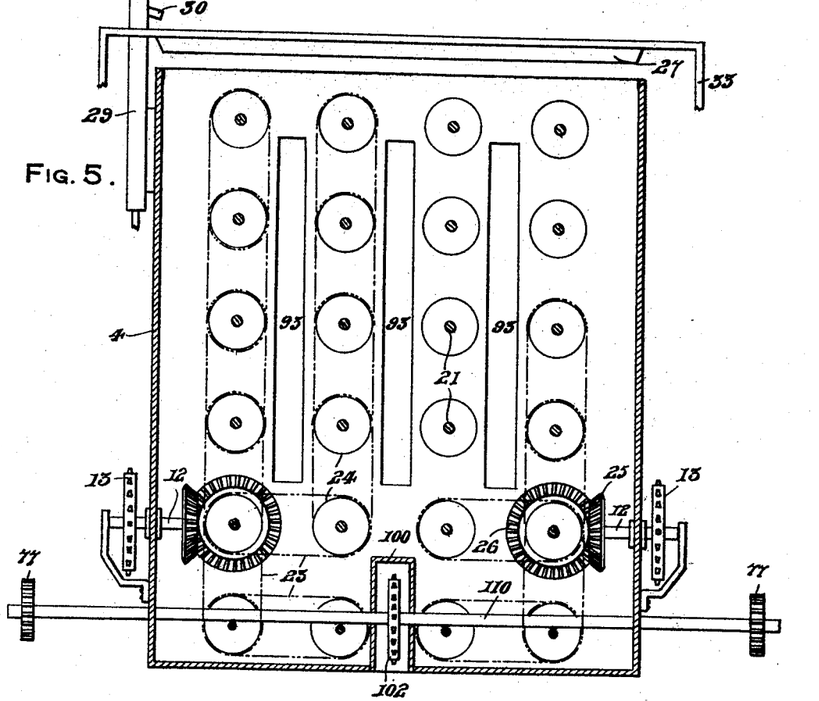
Fig. 5 is a top plan view of the truck with a portion of the platform removed.
Figure 6:
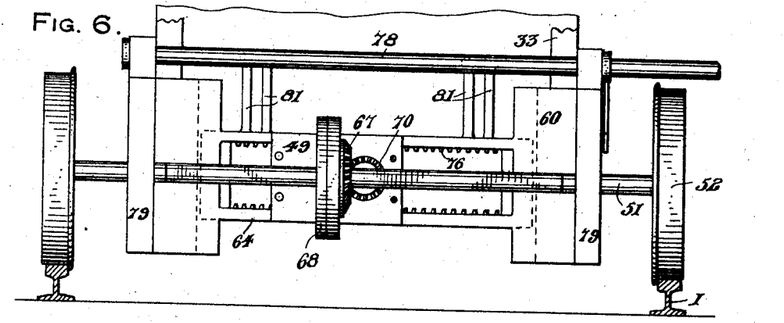
Fig. 6 is an end elevational view of the truck showing the driving means therefor and the directing changing means for the platform.
Figure 7:
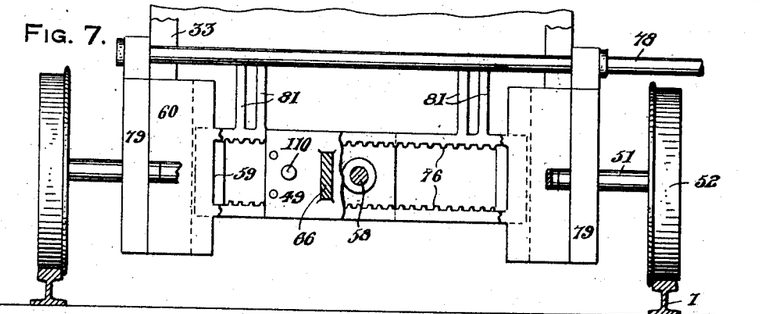
Fig. 7 is a similar view with parts broken away and other parts shown in vertical section.
Figure 8:
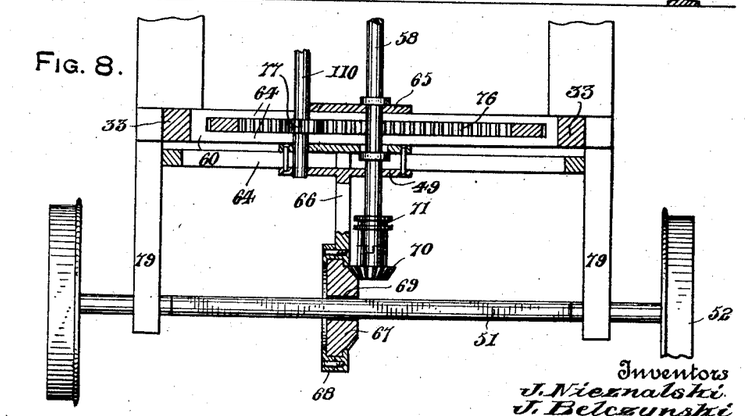
Fig. 8 is a top plan view of the same with portions shown in horizontal section.
Figure 9:
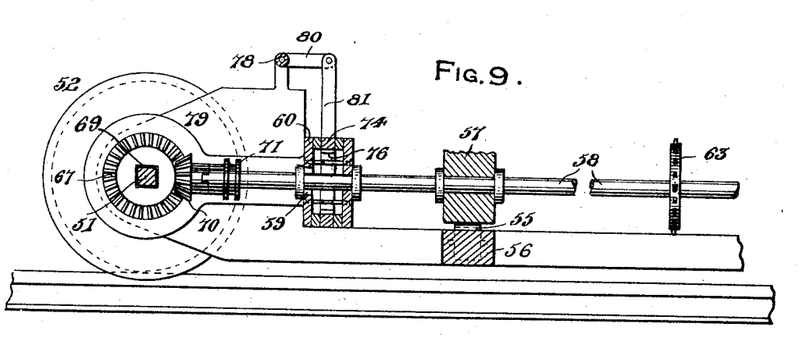
Fig. 9 is a vertical longitudinal sectional view through an end portion of the truck and platform.
Figure 10:
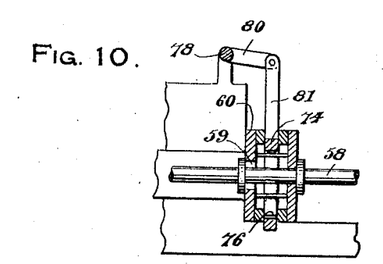
Fig. 10 is a detail sectional view of the direction changing means for the shiftable platform.
Figure 11:
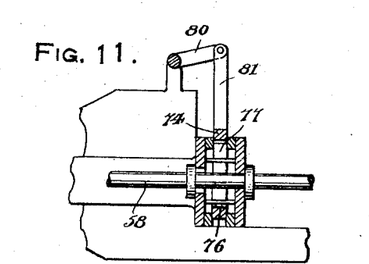
Fig. 11 is a similar view with the mechanism arranged in its opposite position for moving the platform in an opposite direction.
Figures 12, 13:
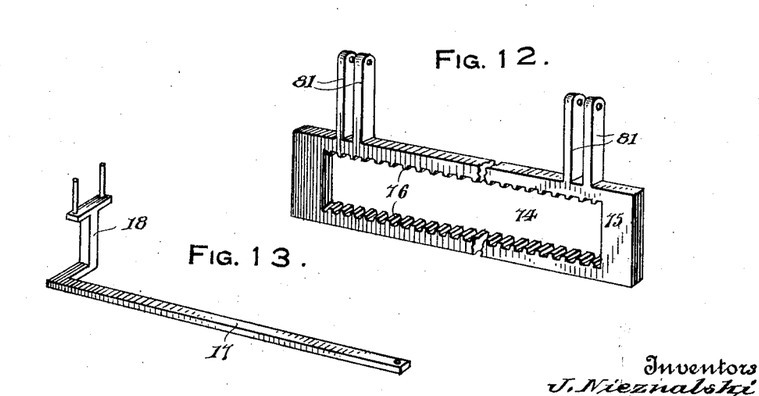
Fig. 12 is a perspective view of one of the shiftable double racks employed with the directing changing mechanism of the platform.
Fig. 13 is a perspective view of the clutch lever connections for the boring mechanism.
Figure 14:
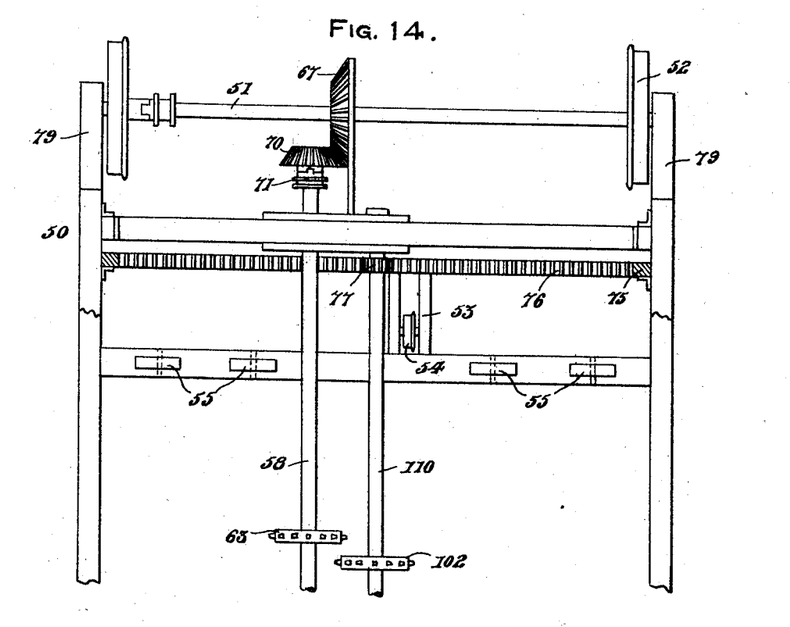
Figs. 14 and 15 are top plan views of forms of truck members and operating means employed.
Figure 15:
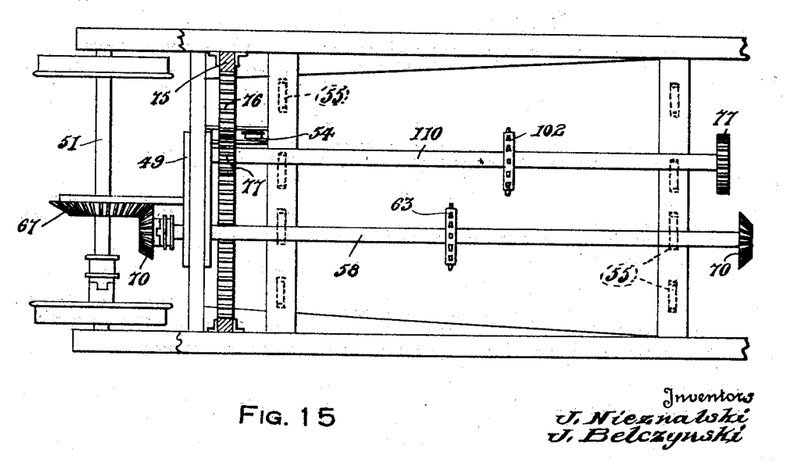
Figures 16, 17:
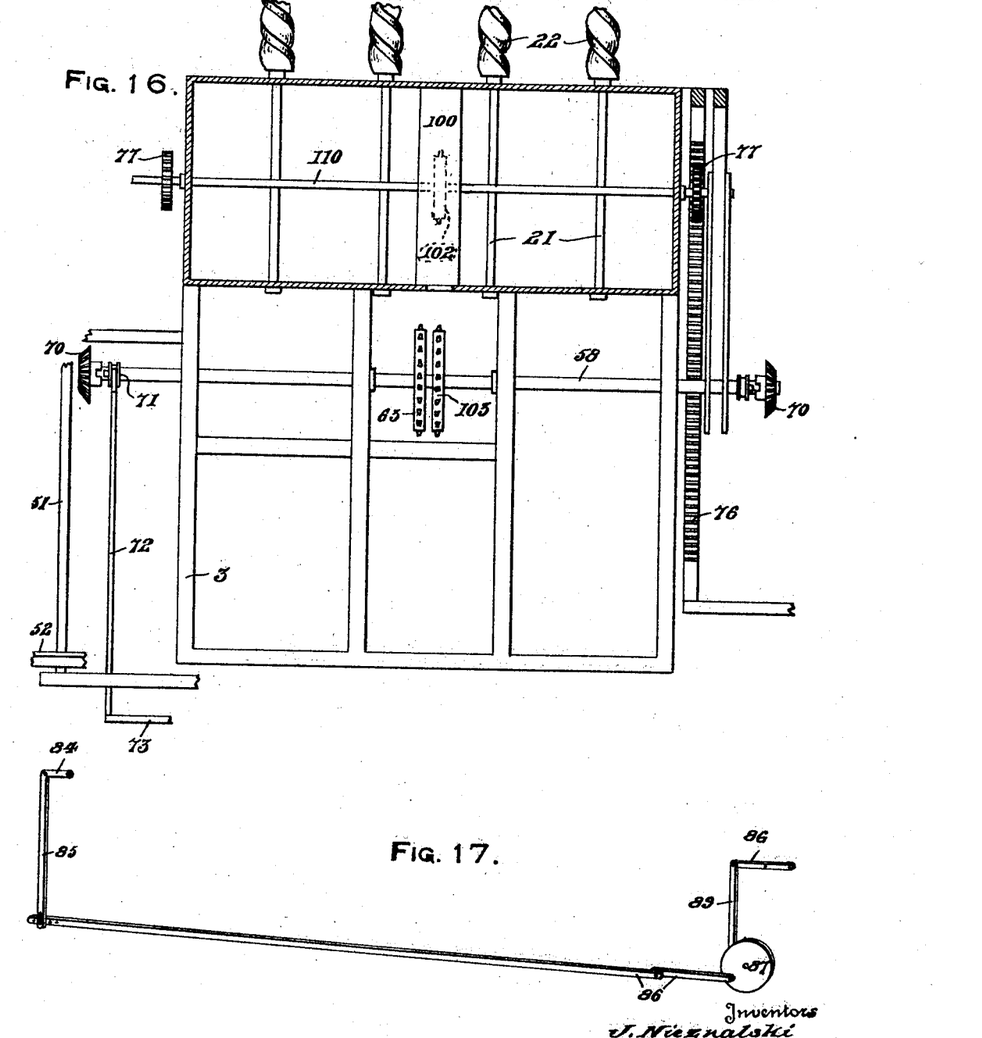
Fig. 16 is a horizontal sectional view through an end portion of the device with parts removed and parts in top plan.
Fig. 17 is a detail view of the direction changing means for the shiftable platform.
Figure 18:
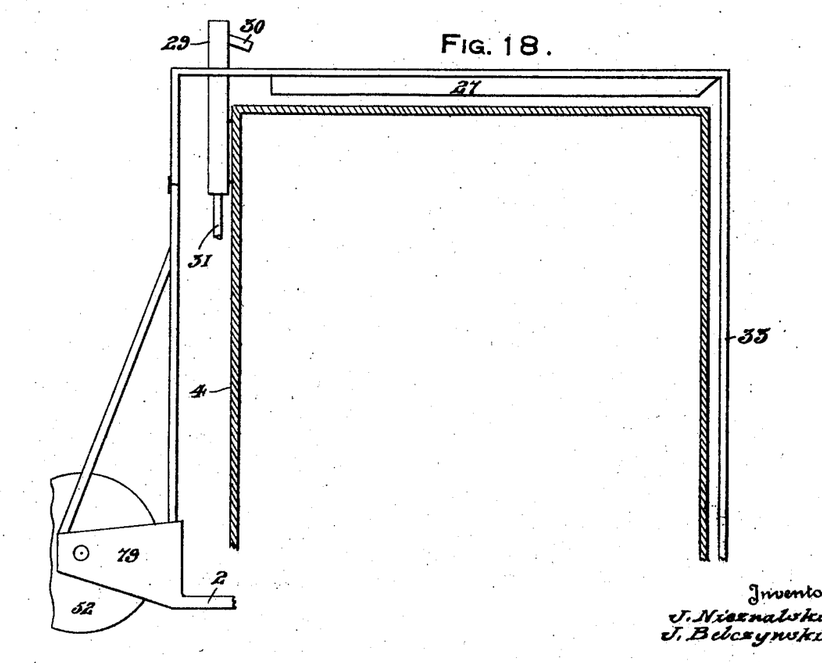
Fig. 18 is a side elevation of the water cooling means with the casing in section.
Figure 19:
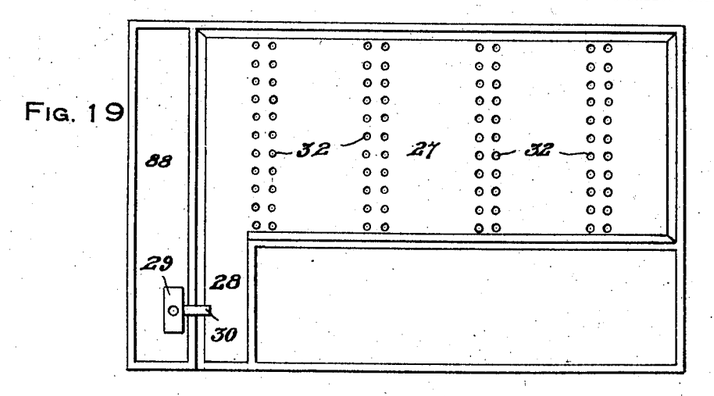
Fig. 19 is a top plan view thereof.
Figure 20:
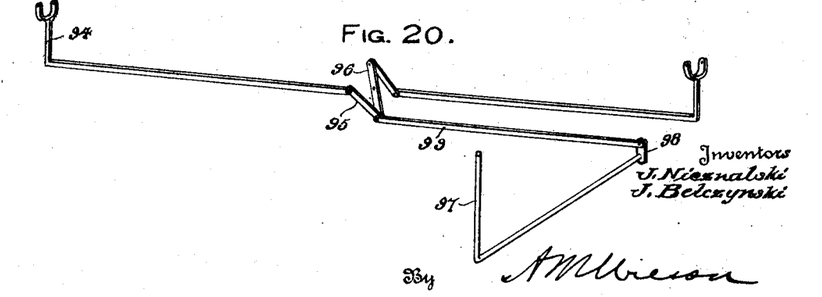
Fig. 20 is a perspective view of another clutch lever connection for the boring mechanism.

While the selective control of the clutches 19 by the levers 17 and handles 20 is believed preferable, the simultaneous operation of the clutches 19 for stopping and starting all of the shafts 21 collectively in illustrated in Fig. 20 of the drawings, and also in Fig. 3 assembled upon the machine. Angular clutch arms or collars 94 engage the clutch members 19 in the usual manner as shown in Fig. 3 while the adjacent inner ends of the arms 94 are pivotally connected by links 95 to a rocker 96 centrally pivoted as at 97 to any convenient support upon the platform 3. It will be apparent that upon turning the rocker 96 upon its pivot 97, the arms 94 will be simultaneously retracted or projected, thereby influencing the clutch members 19 for either opening or closing the same.

An angular operating lever 97 has a finger 98 at one end pivotally connected by means of a link 99 with one end of the rocker 96. The lever 97 is conveniently located upon the platform 3 whereby its swinging movment in either direction will shift the rocker 96 for controlling the clutch members 19.

The opposite ends of the gear shaft 110 are journaled in the bearing blocks 49 for the shaft 58 and a housing 100 is provided within the casing 4 for the chain 101 passing over a sprocket 102 upon the shaft 110 and over a sprocket 103 carried by the shaft 9. The complete operation of the invention has been fully set forth in the detailed description thereof, the machine being driven upon the track 1 by the motor 10 controlled by the clutch members 71 while the movement of the platform 3 in either direction is controlled by the shaft 78 and handle 82, the augers 22 being controlled by the clutches 19.

While the form of the invention herein set forth is believed to be preferable, it will be understood that minor changes may be made without departing from the spirit and scope of the invention as claimed.

What we claim as new is:—

1. A machine of the character described comprising a wheel mounted motor truck, a platform anti-frictionally supported upon said truck, a motor supported on the platform, and operating mechanism connecting the motor with the truck wheels and with the platform whereby the truck is adapted for travel simultaneously with a relative shifting of the platform upon the truck.

2. In a machine of the character described, a wheel mounted truck, a platform mounted for movement transversely of the truck, a motor mounted on the platform and driving connections between the motor and truck wheels and the platform capable of independent operation whereby the truck is adapted to travel longitudinally and the platform may move transversely of the truck.

3. In a machine of the character described, a wheel mounted truck, a motor having driving connection with the truck for propelling the latter, a platform mounted for movement transversely of the truck and supporting the motor, the driving connection between the motor and truck wheels including a main drive shaft movable with the platform and a gear wheel operated by said shaft and slidably engaged with a part of the truck, and means connecting a motor with the platform for shifting the latter transversely of the truck in either direction.

4. In a machine of the character described comprising a wheel mounted truck, a platform mounted for movement transversely of the truck, a motor mounted on the platform, a drive shaft associated with the motor, double rack elements carried by the truck, pinions carried by the drive shaft engageable with the rack elements, and means for shifting the racks vertically for alternately meshing the opposed sets of teeth with said pinions whereby the direction of movement of the platform may be varied.

In testimony whereof we affix our signatures.

JOSEPH NIEZNALSKI.
JAN BELCZYNSKI.